US007272785B2

United States Patent
Fukuda et al.

(10) Patent No.: US 7,272,785 B2
(45) Date of Patent: Sep. 18, 2007

(54) DATA EDITING FOR IMPROVING READABILITY OF A DISPLAY

(75) Inventors: Kentaro Fukuda, Sagamihara (JP); Junji Maeda, Tokyo-to (JP); Hidemasa Muta, Tokyo (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 10/845,919

(22) Filed: May 14, 2004

(65) Prior Publication Data

US 2005/0041040 A1  Feb. 24, 2005

(30) Foreign Application Priority Data

May 20, 2003   (JP) .............................. 2003-141588

(51) Int. Cl.
*G06F 17/24* (2006.01)
(52) U.S. Cl. ..................................... 715/511
(58) Field of Classification Search ................ 715/511
See application file for complete search history.

(56) References Cited

U.S. PATENT DOCUMENTS

| 5,589,898 | A | * | 12/1996 | Atkinson | 351/237 |
| 6,160,576 | A | * | 12/2000 | Higuchi et al. | 348/62 |
| 6,309,117 | B1 | * | 10/2001 | Bunce et al. | 400/61 |
| 6,362,830 | B1 | * | 3/2002 | Walraven | 345/600 |
| 6,591,008 | B1 | * | 7/2003 | Surve et al. | 382/162 |
| 6,624,828 | B1 | * | 9/2003 | Dresevic et al. | 715/771 |
| 6,714,963 | B1 | * | 3/2004 | Levine et al. | 709/203 |
| 6,931,151 | B2 | * | 8/2005 | Weast | 382/162 |
| 2002/0156799 | A1 | * | 10/2002 | Markel et al. | 707/202 |
| 2004/0136570 | A1 | * | 7/2004 | Ullman et al. | 382/114 |
| 2004/0148568 | A1 | * | 7/2004 | Springer | 715/513 |
| 2005/0160065 | A1 | * | 7/2005 | Seeman | 707/1 |

FOREIGN PATENT DOCUMENTS

| JP | 05-213871 | 8/1993 |
| JP | 08-213069 | 7/1996 |
| JP | 11-149690 | 5/1999 |

OTHER PUBLICATIONS http://www.w3.org/WAI/impl/software, as it appeared on Oct. 25, 2002.*

* cited by examiner

*Primary Examiner*—Doug Hutton
(74) *Attorney, Agent, or Firm*—Louis P Herzberg

(57) ABSTRACT

Provides ability to analyze the readability of an image to be displayed on a screen as a web page, etc., and appropriately modify the image. It includes a rendering section for generating an image by rendering an HTML document; an image processing section for performing image processing on the image generated by the rendering section to simulate and evaluate how the image is viewed under a certain visual characteristic; and a result presentation section for locating an HTML element that needs to be modified in the HTML document to be processed based on the evaluation result of the image processing section 30 and for presenting the HTML element to a web page creator. The result presentation section also retrieves a modification method for the HTML element that needs to be modified from a symptom model storage section. A document modification processing section actually modifies the HTML document.

7 Claims, 17 Drawing Sheets

[Figure 1]
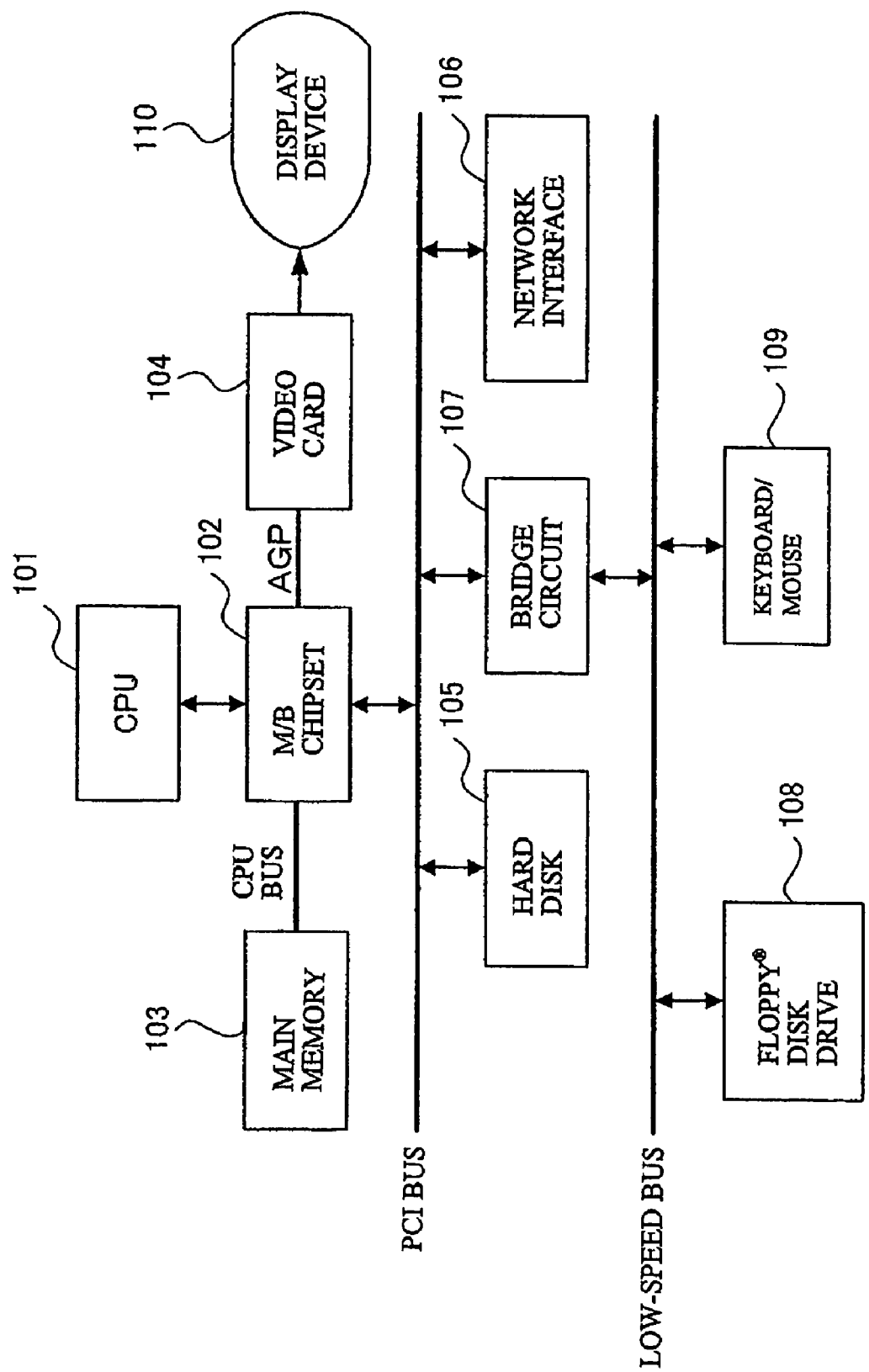

[Figure 2]
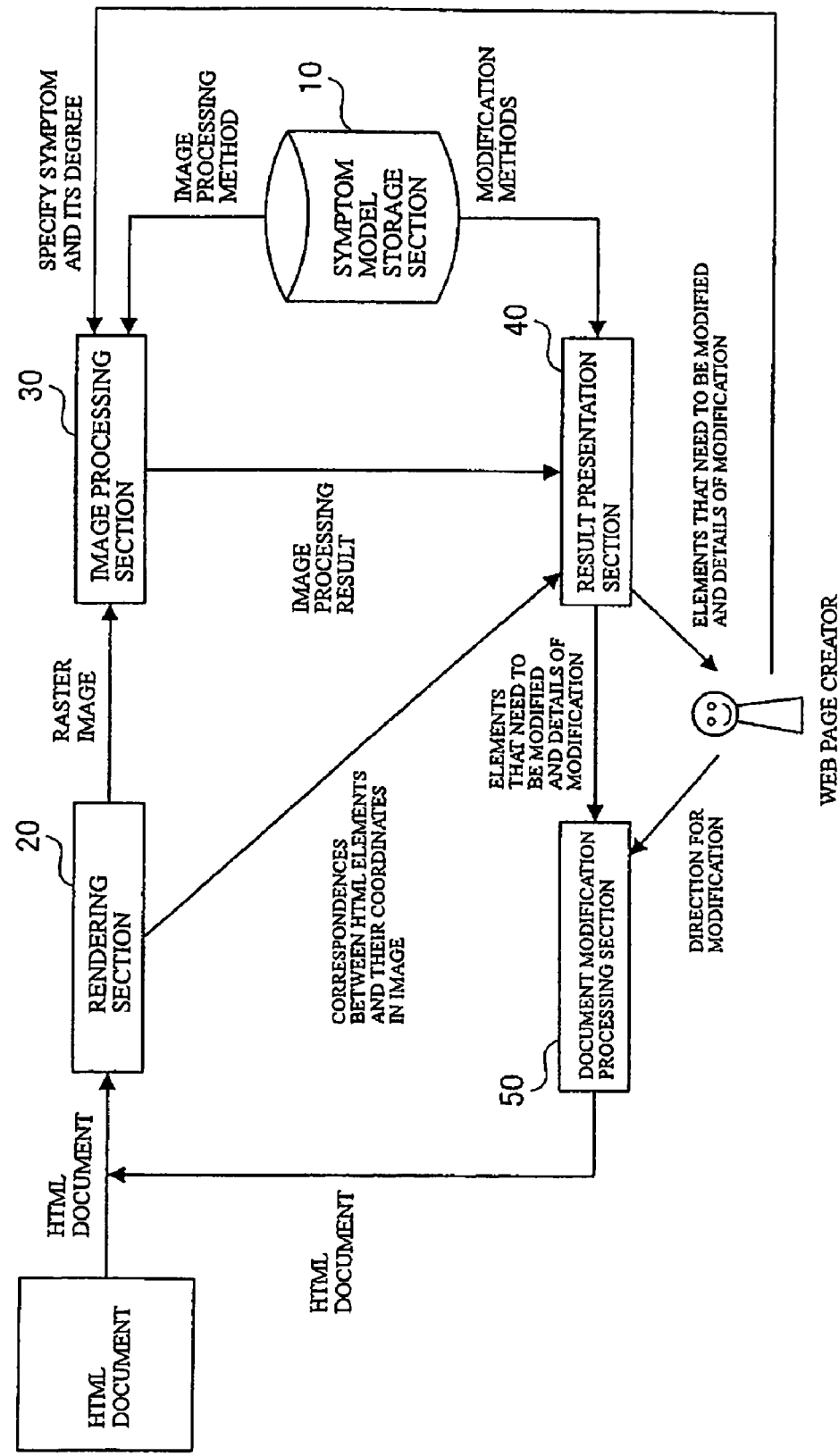

[Figure 3]

| NAME | PHENOMENON | IMAGE PROCESSING METHOD | MODIFICATION METHOD |
|---|---|---|---|
| DECREASED FOCUSING ABILITY (MYOPIA, PRESBYOPIA) | IMAGE FORMED ON RETINA BLURS | CONVOLVE CYLINDRICAL FUNCTION REPRESENTING BLUR (PARAMETER: RADIUS OF CYLINDER) | · ENLARGE CHARACTERS<br>· CHANGE FONT INTO PLAIN FONT<br>· INCREASE LINE SPACING |
| COLOR VISION DEFICIENCY | CANNOT DISTINGUISH BETWEEN COLORS IN PARTICULAR COMBINATIONS | REPLACE COLOR WITH COLOR ON CONFUSION LINE (PARAMETER: CONFUSION LINE DIAGRAM) | · SET CHARACTER COLOR AND BACKGROUND COLOR TO COMBINATION OF COLORS DISTANT FROM EACH OTHER ON CONFUSION LINE DIAGRAM<br>· INCREASE DIFFERENCE IN LIGHTNESS BETWEEN CHARACTER COLOR AND BACKGROUND COLOR |
| PRESBYOPIA (DECREASED FREQUENCY CHARACTERISTIC) | CANNOT RECOGNIZE HIGH-FREQUENCY PORTION | APPLY LOW PASS FILTER (PARAMETER: CUT FREQUENCY) | · ENLARGE CHARACTERS<br>· CHANGE FONT INTO PLAIN FONT |
| PRESBYOPIA (YELLOWED CRYSTALLINE LENS) | HARD TO TRANSMIT LIGHT, ESPECIALLY OF SHORT WAVELENGTH (ON BLUE SIDE) | DARKEN COLORS ACCORDING TO WAVELENGTH (PARAMETER: RELATIONSHIPS BETWEEN COLORS AND DEGREE OF DARKENING) | · LIGHTEN COLORS ACCORDING TO WAVELENGTH |
| · · · · · | · · · · · | · · · · · | · · · · · |

[Figure 4]
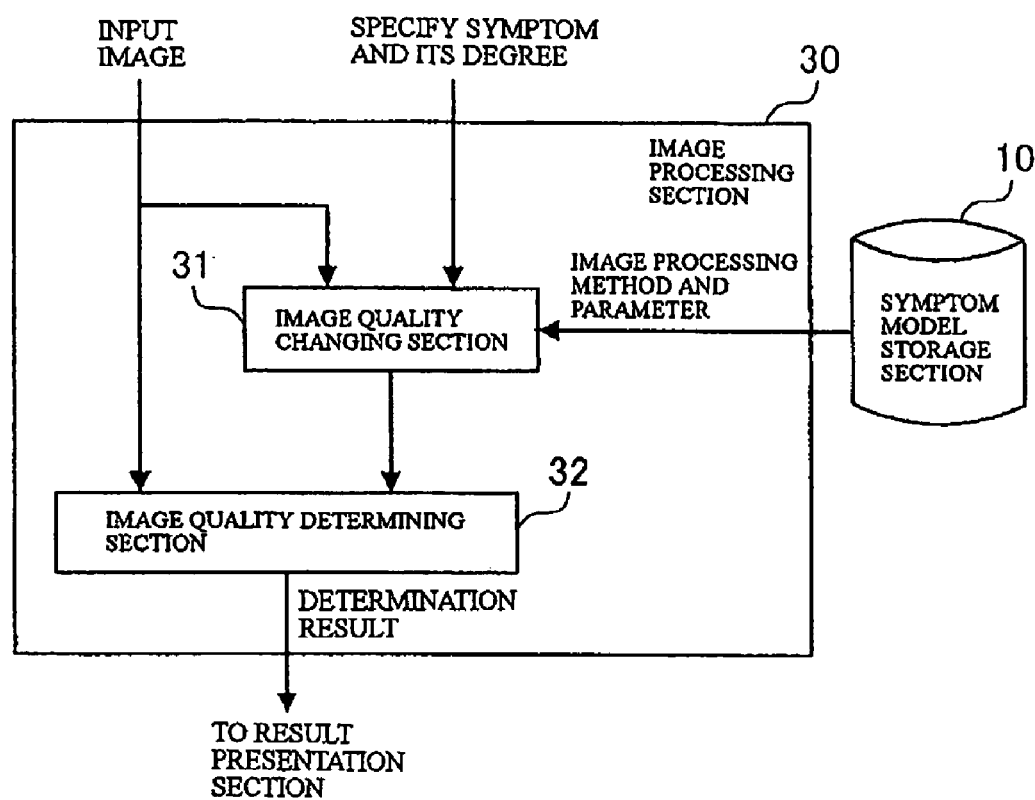

[Figure 5]
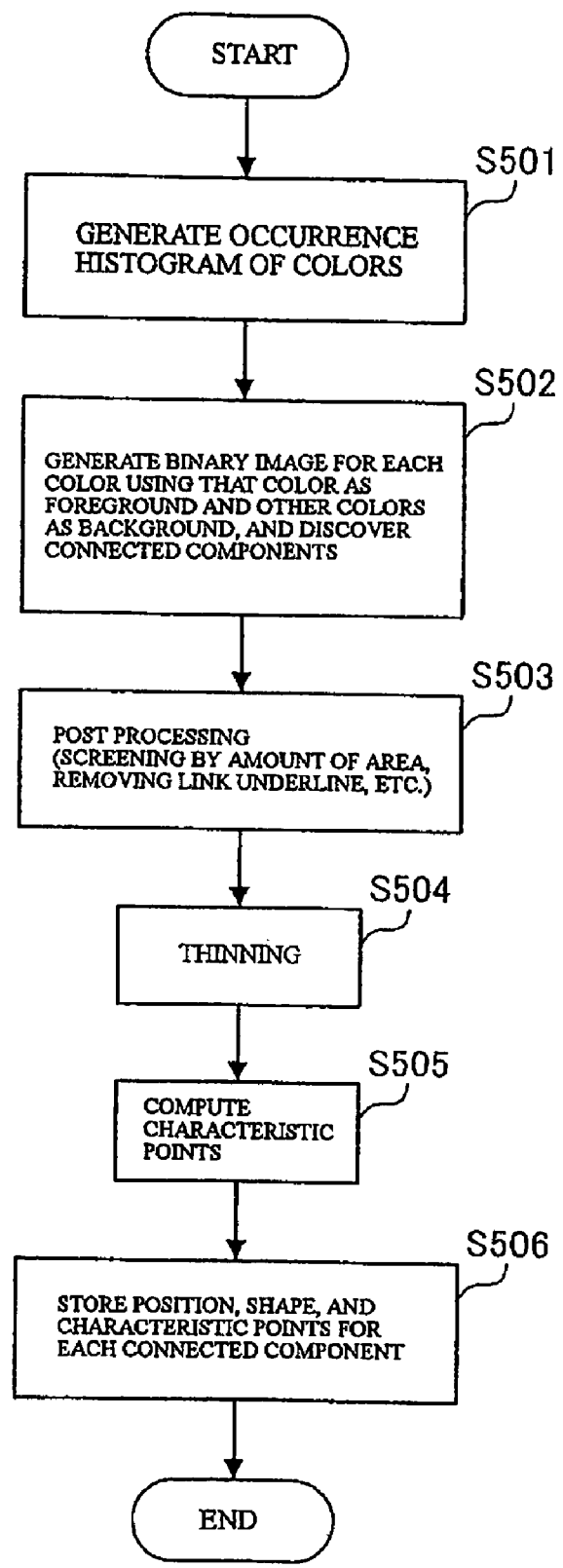

[Figure 6]
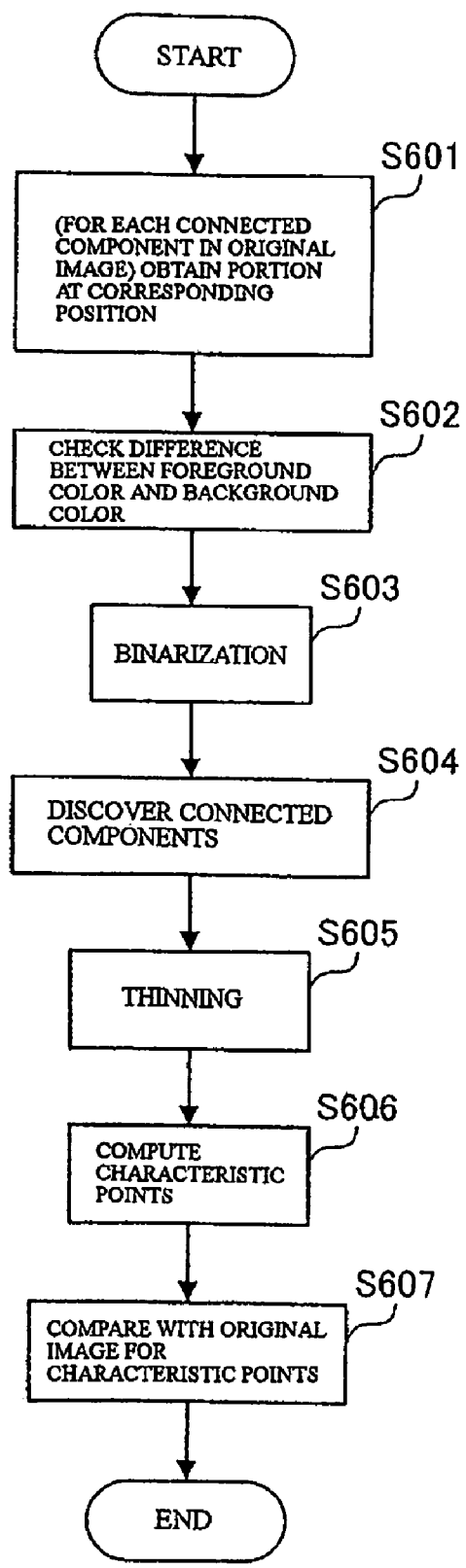

[Figure 7]
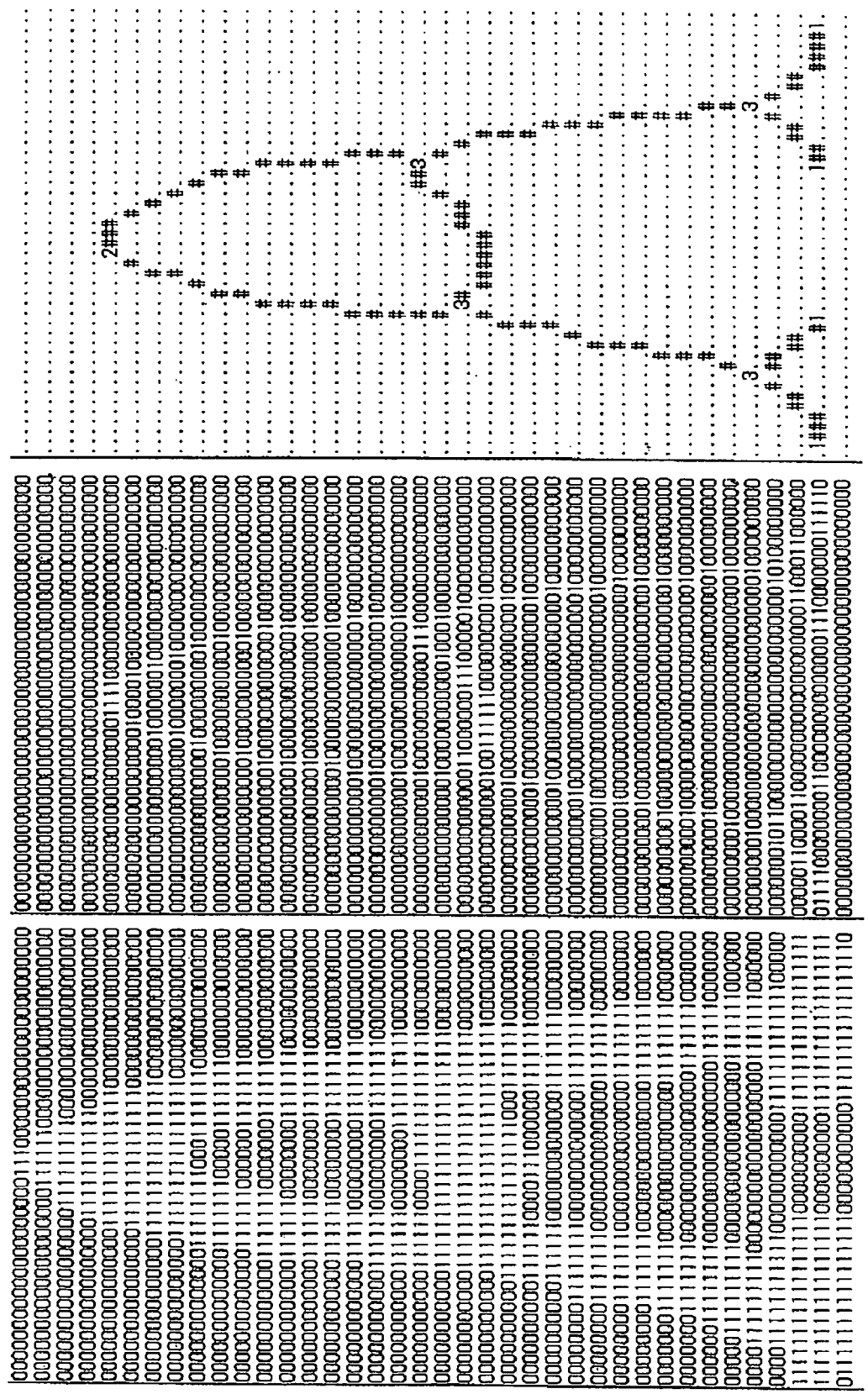

[Figure 8]
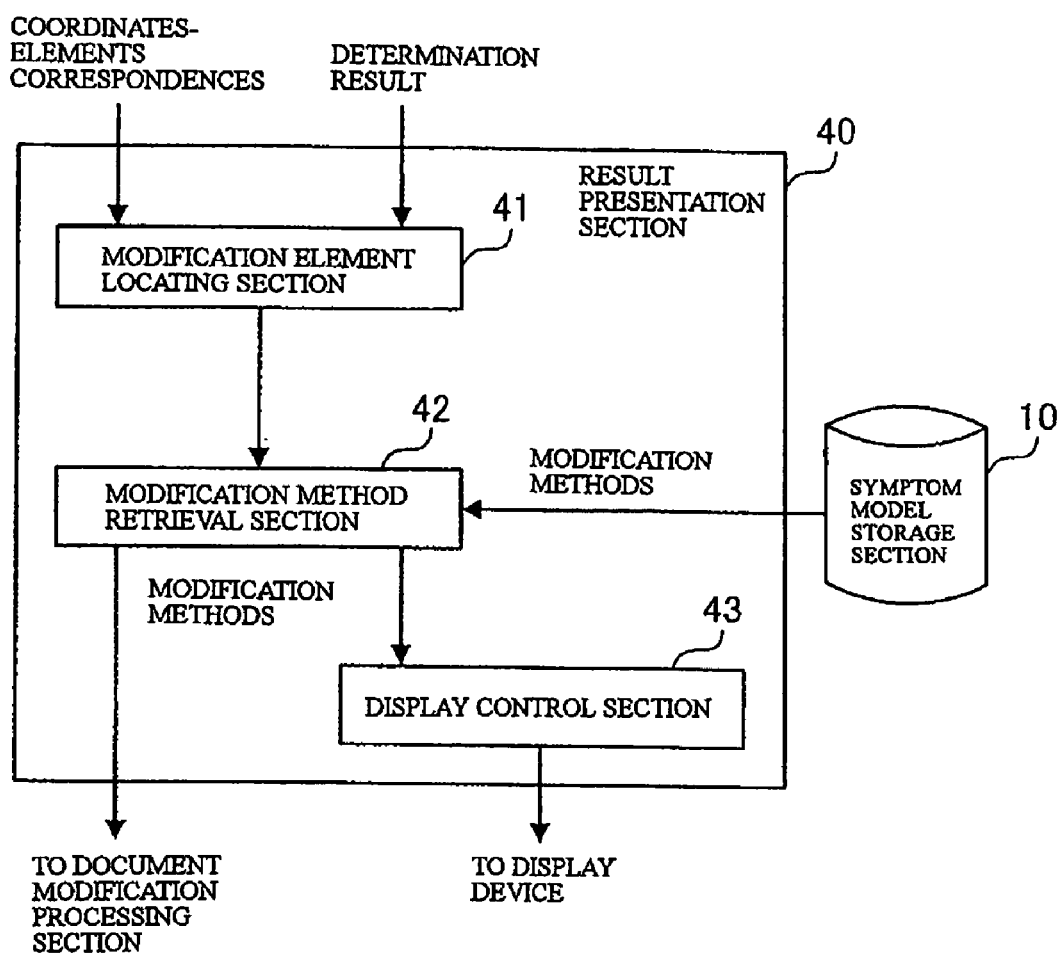

[Figure 9]
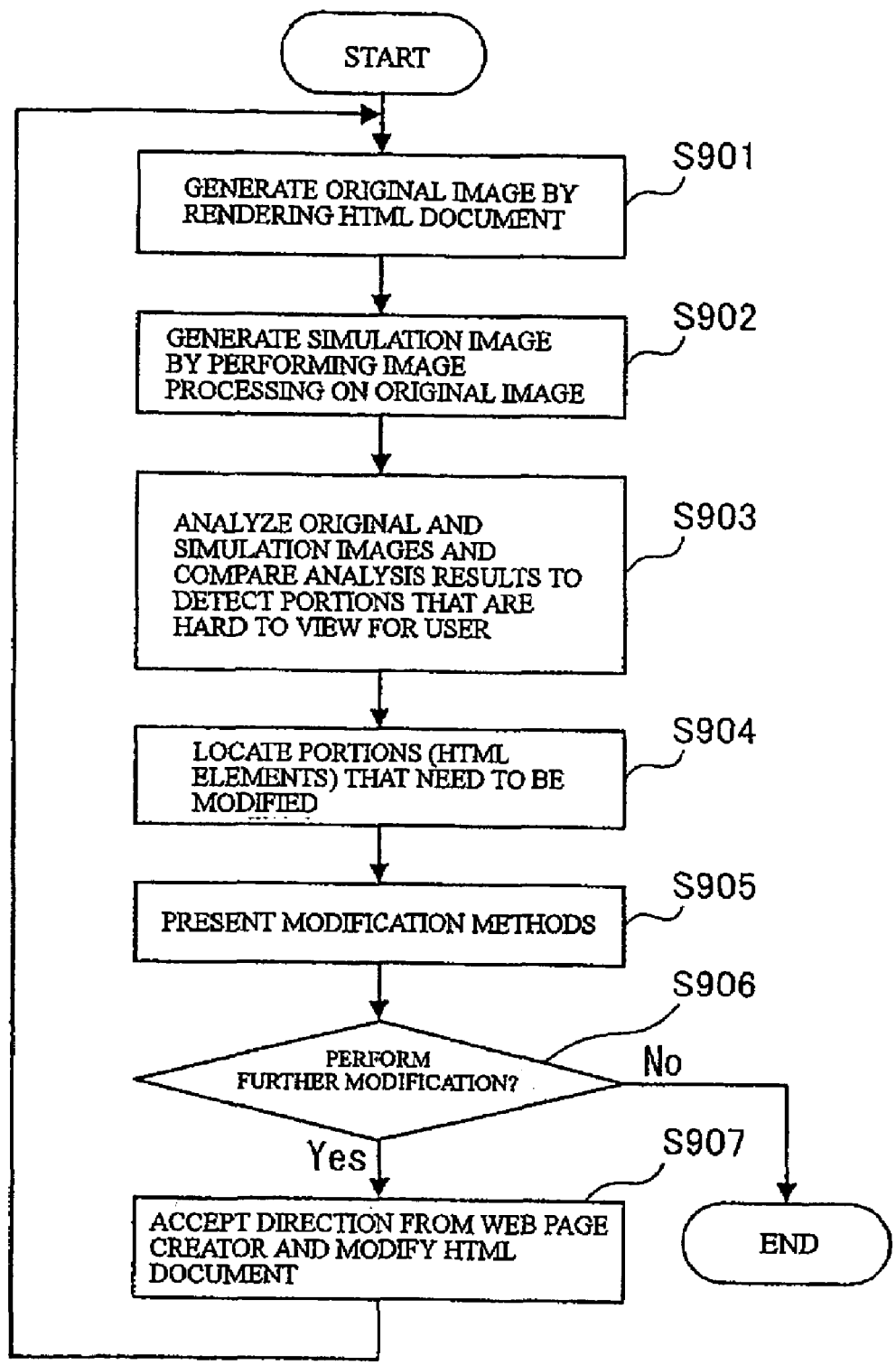

[Figure 10]
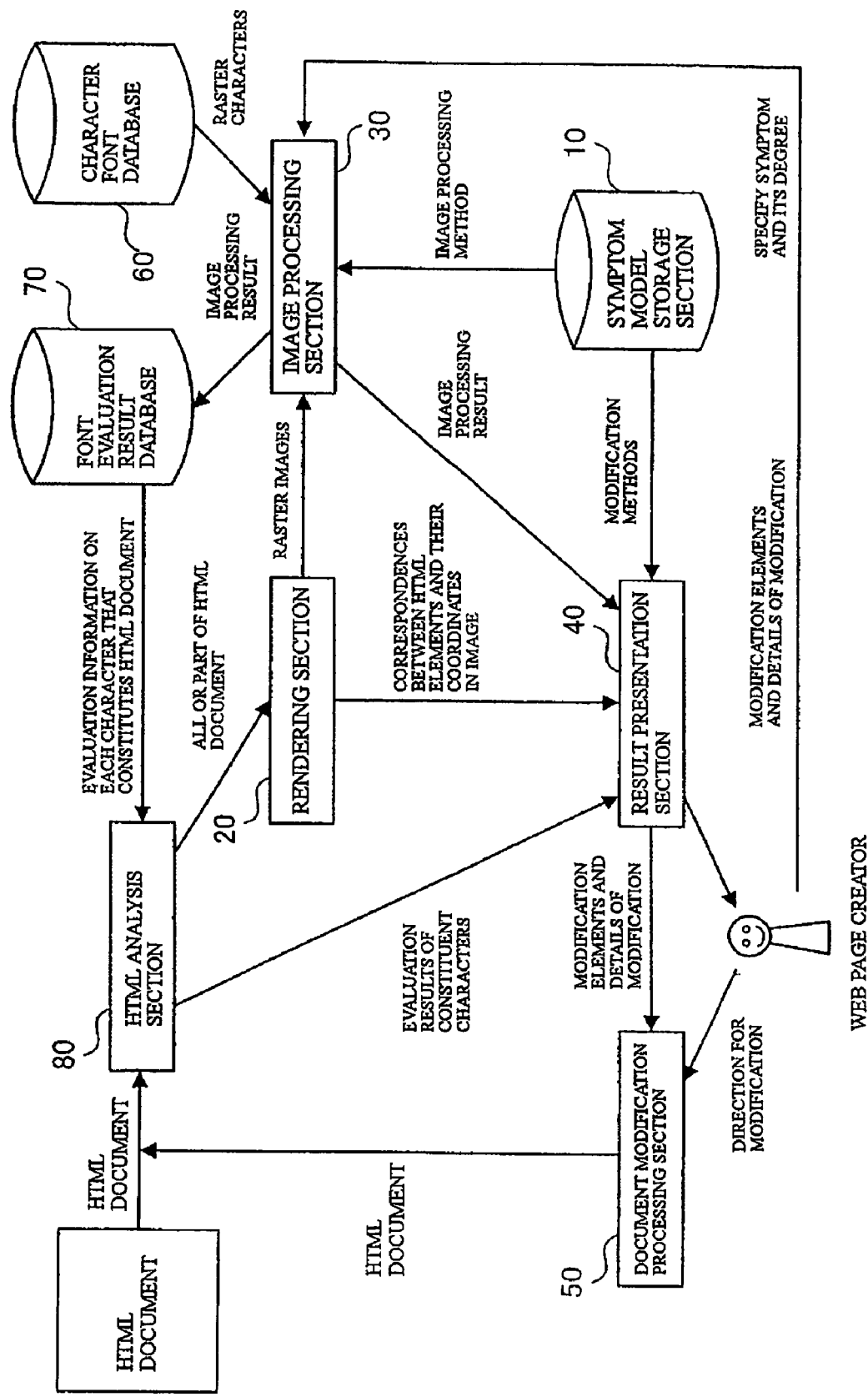

[Figure 11]
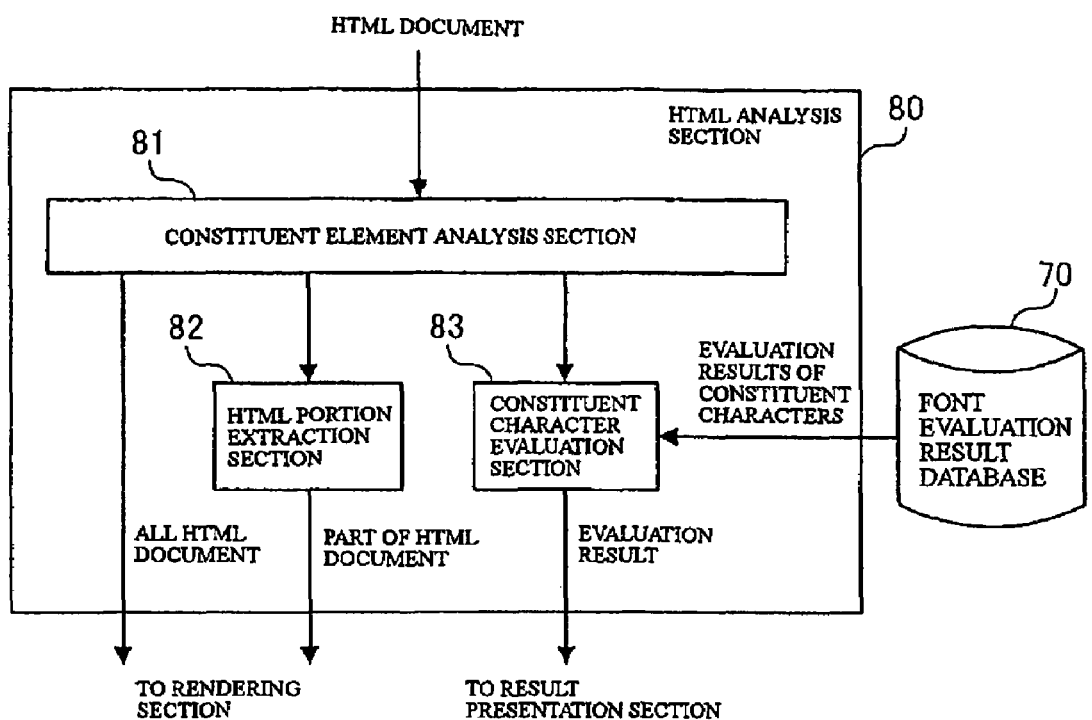

[Figure 12]
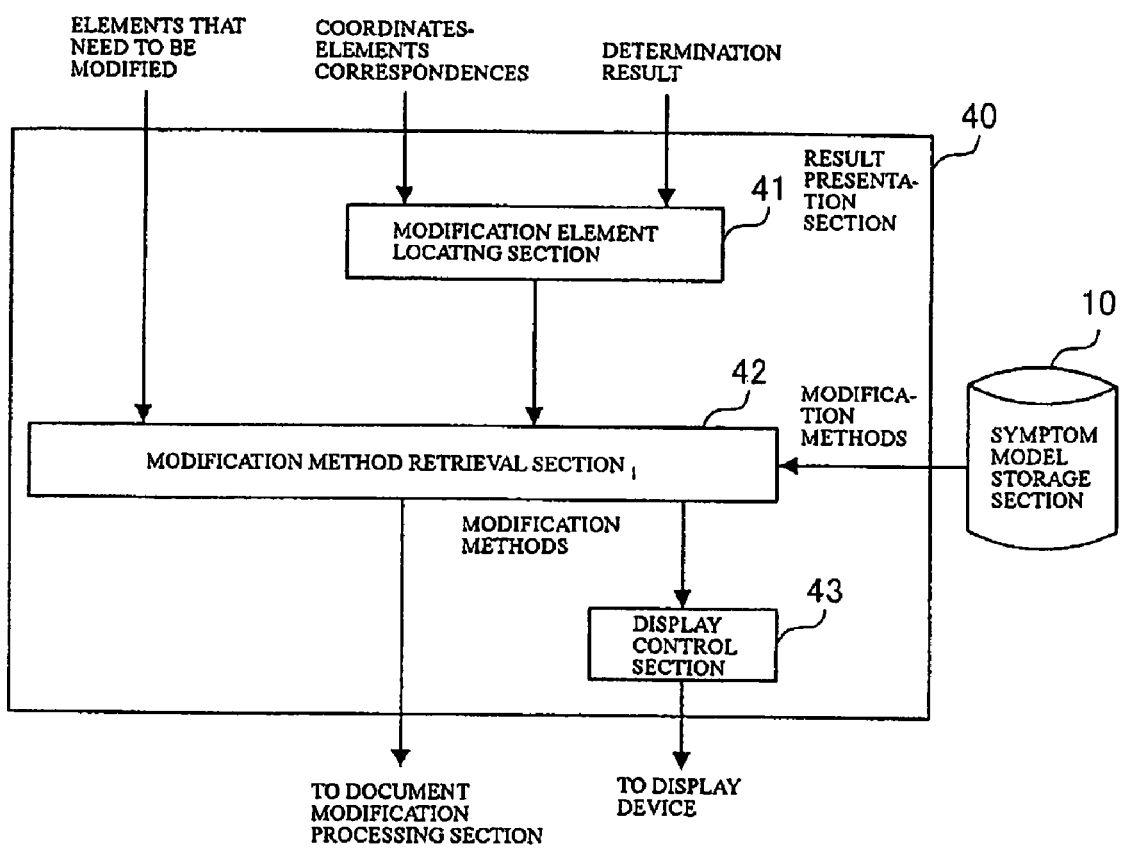

[Figure 13]
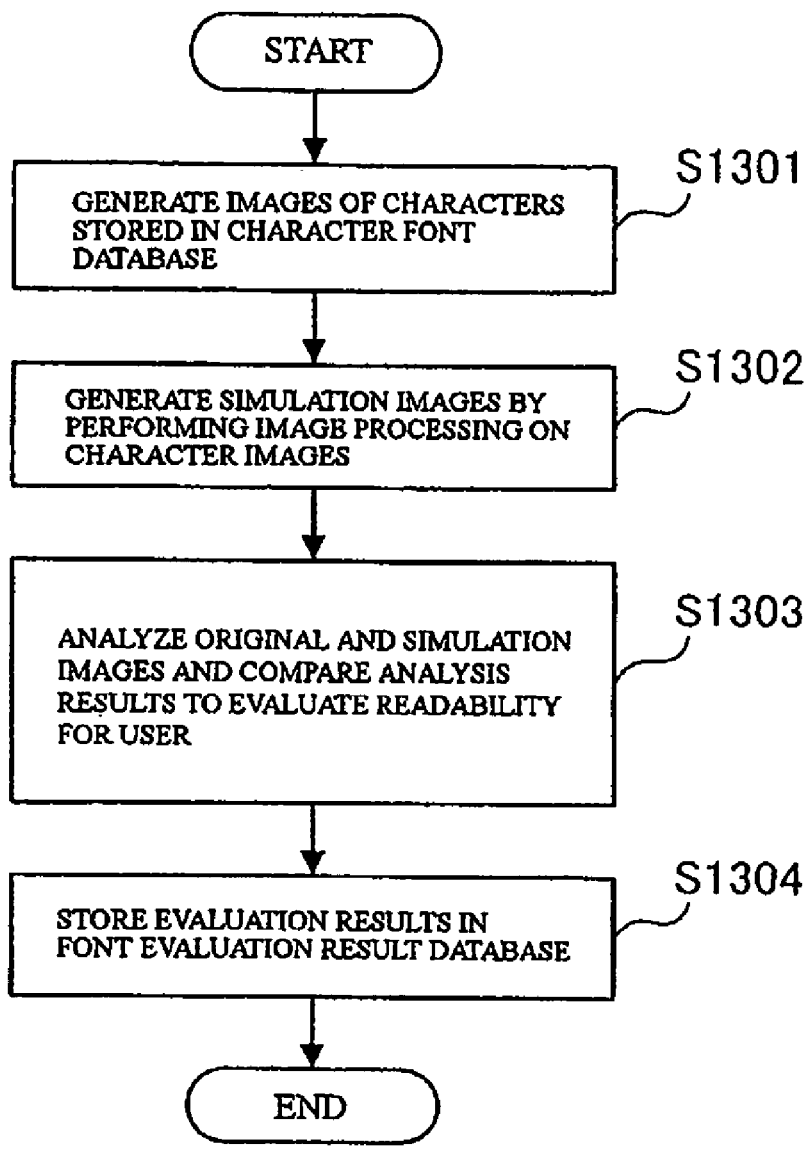

[Figure 14]
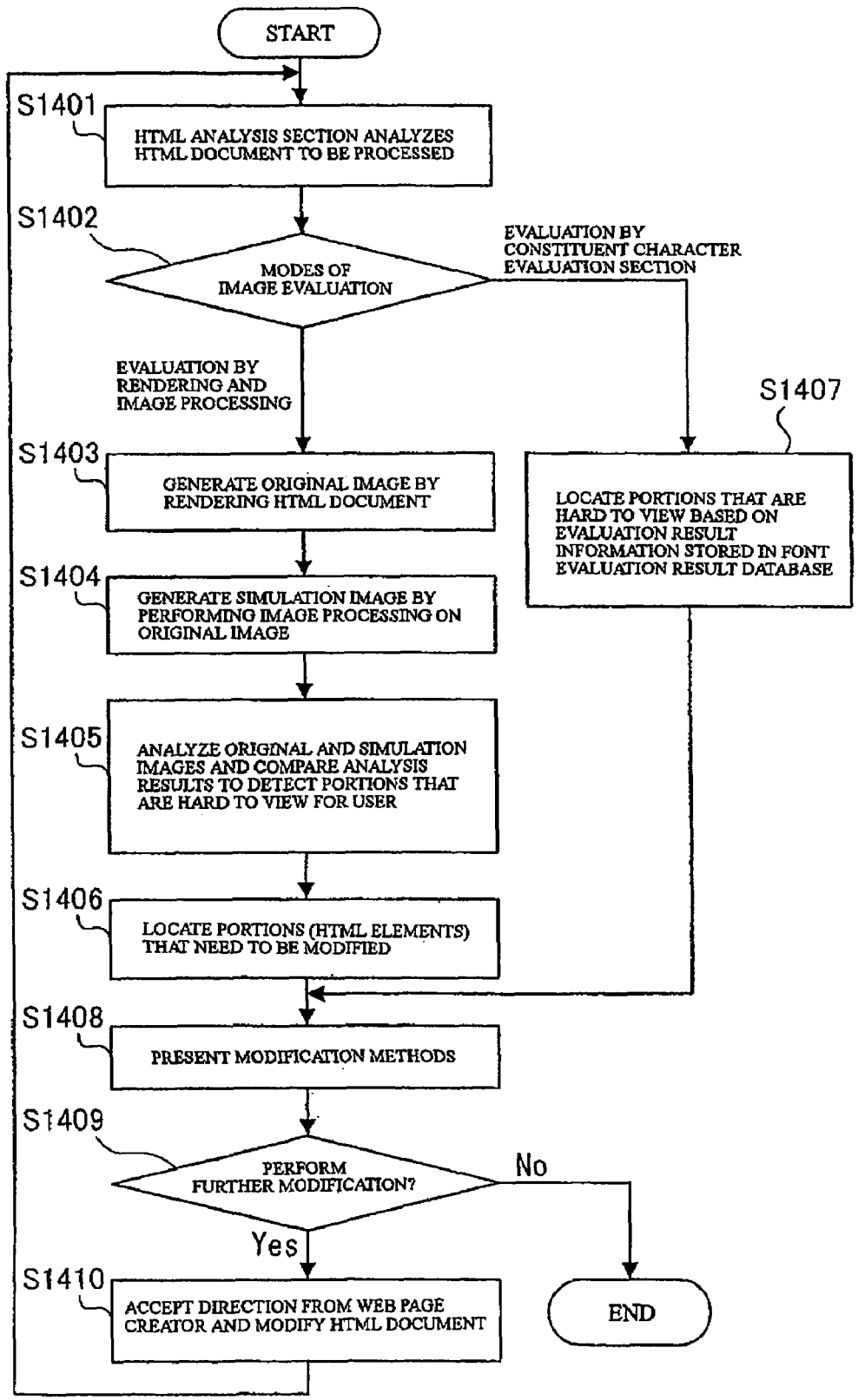

[Figure 15]
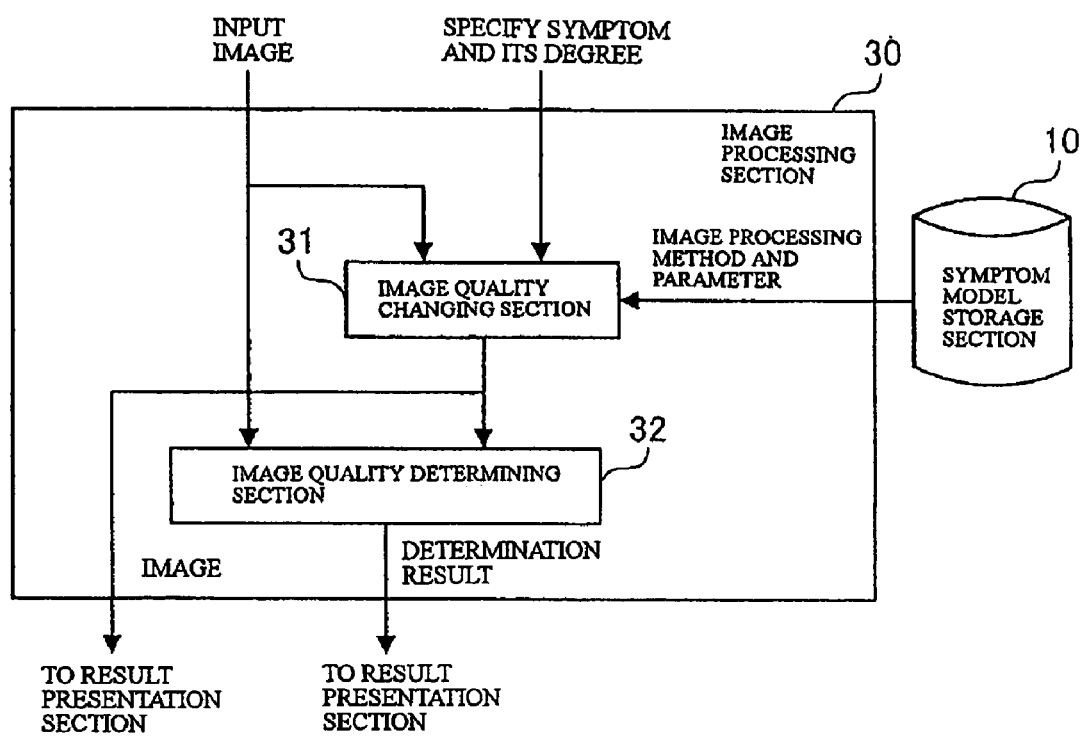

[Figure 16]
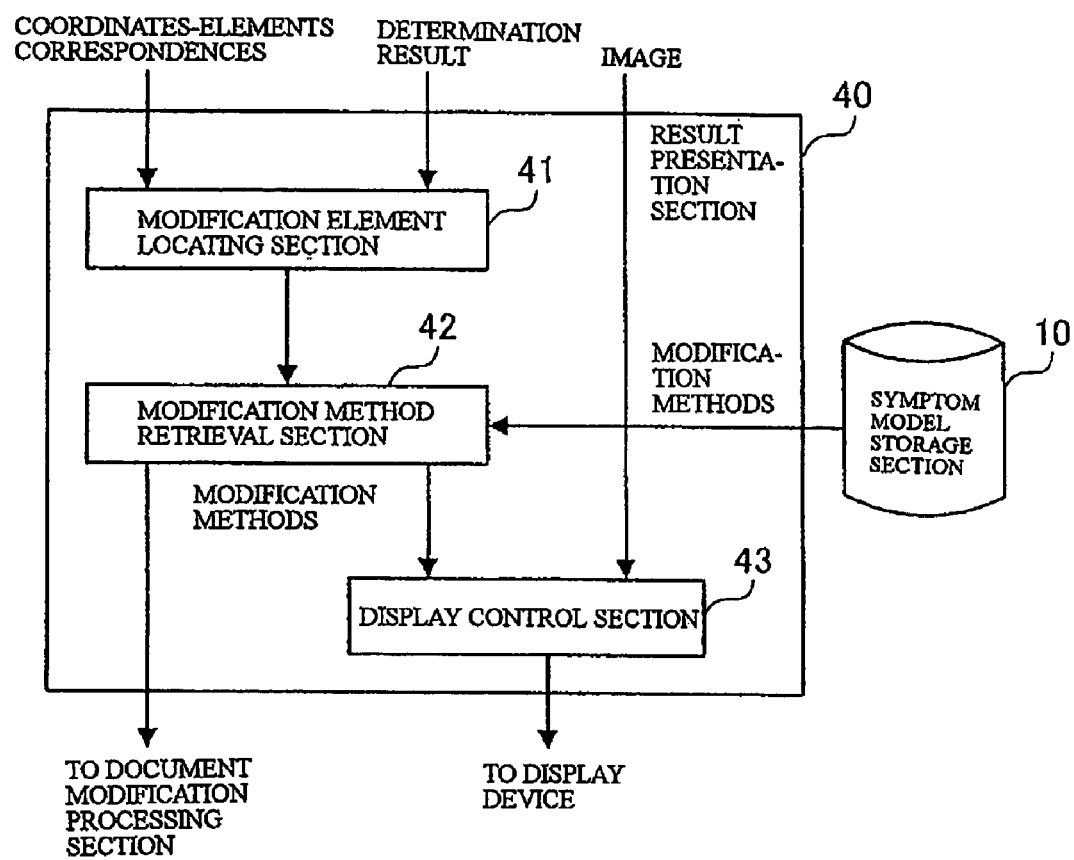

[Figure 17]
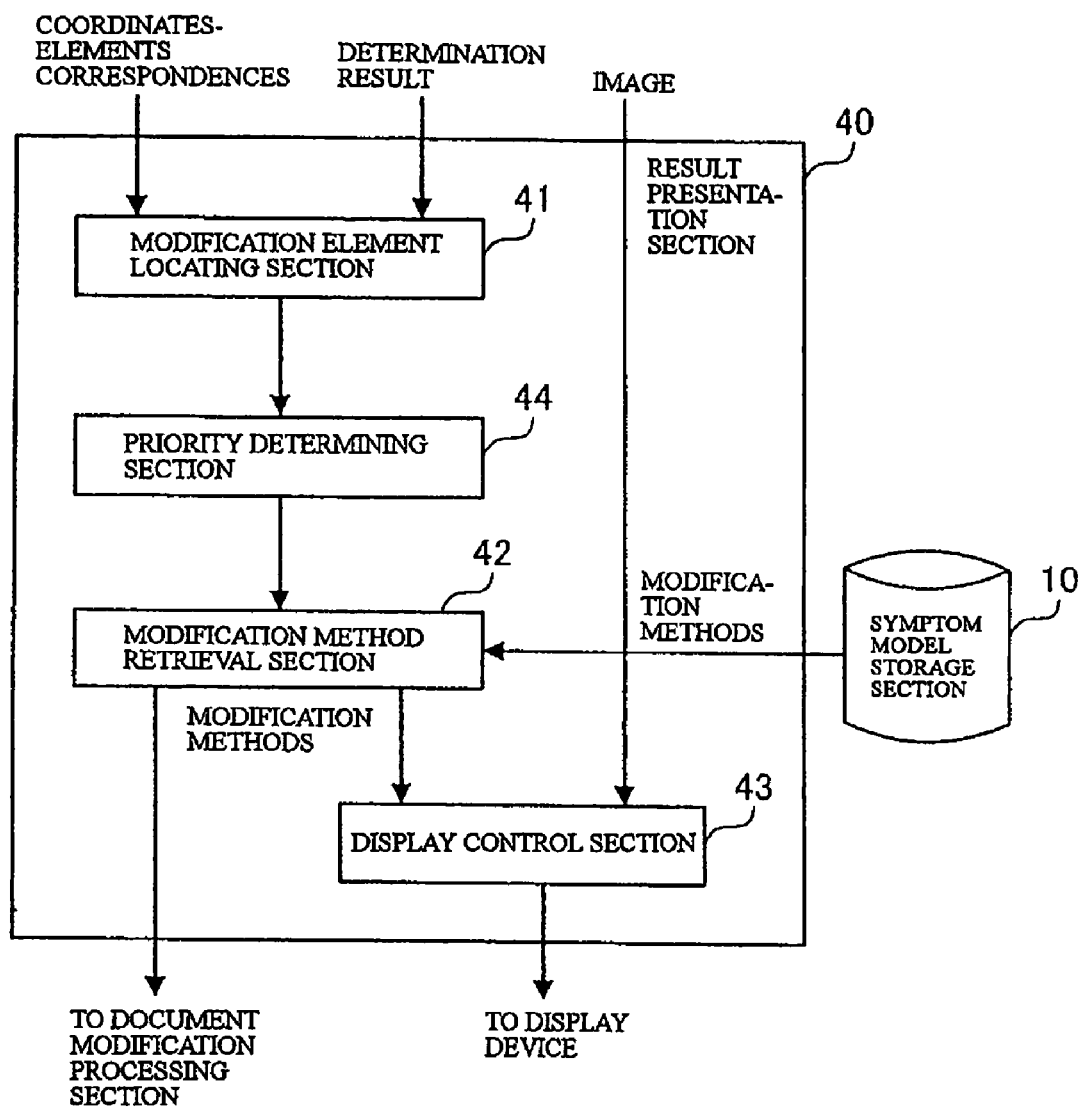

DATA EDITING FOR IMPROVING READABILITY OF A DISPLAY

FIELD OF THE INVENTION

The present invention is directed to data editing techniques, and more particularly to data editing systems and methods for improving readability of a display.

BACKGROUND OF THE INVENTION

With the development of the Internet, information distribution through web pages has become an important social key technology. Therefore, it is desired that web pages be easy to view even for users (viewers of web pages) having trouble with their eyesight, such as visually impaired people and senior citizens. Measures have been taken for readability of a web page, such as providing a style sheet for each user on a client or providing a transcoding system on a network. However, it will be more advantageous as fundamental measures that an original web page be designed to be easy to view.

Accessibility checkers have been used as a technique by which web page creators can improve accessibility of web pages. An accessibility checker analyzes an HTML (Hypertext Markup Language) document and checks its accessibility in accordance with a guideline established by WAI (Web Accessibility Initiative) of W3C (World Wide Web Consortium). Modifying the web page based on the result of this checking can produce a web page that conforms to the WAI guideline.

As to techniques not limited to web pages but generally related to image display using a computer, there are other techniques in the art regarding the eyesight of visually impaired people and senior citizens. One technique involves generating an image and subjecting it to image processing corresponding to a visually impaired person, an aged person, or any of various symptoms of visual impairment (such as weakening eyesight, astigmatism, diplopia, contrast, scattering, tunnel vision, visual field defect, etc.) for displaying it on a screen. Another technique discloses means for not only simulating and displaying how a certain image is viewed by senior citizens, but also making modifications by pixel-by-pixel image processing so that the image becomes easy to view for them.

As described above, it would be desirable to create an easily viewable image for displaying on a computer, for example a web page. However, the technique of using the accessibility checker to check the accessibility of a web page has the following problems. One first problem is that the analysis of an HTML document has a limitation. The checker cannot provide a specific direction about how to modify the image, so that the analysis predominantly relies on human eyes in the end. For example, the above mentioned Bobby can exactly indicate a position having a problem that "there is an image without an ALT attribute", because the problem can be found simply by checking tags. However, it cannot indicate a position having a problem that "the contrast is insufficient between the foreground color and the background color." Therefore, checking problems such as the latter has to rely on a web page creator's eyes. Such check items left to human eyes actually occur in large numbers, which makes efficient checking quite difficult.

Another problem is that, even if a web page is modified for all its check items to ensure that the web page conforms to the WAI guideline, the web page may not actually become easily viewable by a user having problem with his/her eyesight.

Because the guideline is intended to address various disabilities like the highest common factor and is limited to a feasible number of items, it naturally fails to accommodate every web page to perfection.

The fundamental cause of these problems with the accessibility checker lies in that the readability to be achieved when an image is displayed on a screen is checked on an HTML document (text) basis.

On the other hand, prior art apparently simulates how a generated image is viewed by a user having problem with his/her eyesight and displays the result on a screen. However, these techniques only performs simulation for purposes such as virtual experience education and do not take into consideration measures to modify the image so that the user having problem with his/her eyesight can easily view the image.

Another technique has means for modifying the image to be easily viewed by senior citizens, but the technique cannot be applied to web page creation because the modification is based on pixel-by-pixel image processing. The reason is that, for a web page, a web page creator can modify only an HTML document (text) but not a raster image resulted from rendering the HTML document.

Also, the prior art apparently is designed to modify an original image uniformly based on the age of an expected aged user and to display the modified image to the user. It does not indicate which and how portions of the original image are hard to view. In other words, it does not provide an advice or hint about how to configure the original image.

Therefore, if the original image has a bad quality, the readability of the image cannot be improved beyond the limitation of the modification means. For example, if characters in the image are too small to be legible, pixel-by-pixel image processing (such as edge emphasis or contrast improvement) can hardly improve the legibility.

SUMMARY OF THE INVENTION

In view of these problems, an aspect of the present invention is to provide an ability to analyze the readability of an image to be displayed on a screen such as a web page and appropriately modify the image.

Another aspect of the invention is to provide a data editing system for supporting creation of a screen that is easy to view for a user having trouble with his/her eyesight, such as a visually impaired person or an aged person.

An example embodiment of the present invention for achieving the above aspects is implemented as a data editing apparatus. The apparatus comprising: a rendering section for generating an image by rendering certain data; an image processing section for performing image processing on the image generated by the rendering section to simulate how the image is viewed under a certain visual characteristic; a modification portion locating section for locating a modification portion that needs to be modified in the data, the step of locating being based on a processing result of the image processing section; and a modification processing section for modifying the modification portion in the data located by the modification portion locating section.

Another example is a data editing apparatus according to this invention comprises: a rendering section for generating an image by rendering an HTML document; an image processing section for performing image processing on the image generated by the rendering section and evaluating the processed image; a modification element locating section for locating an HTML element that needs to be modified in the HTML document to be modified, the step of locating being based on an evaluation result of the image processing section; a modification method retrieval section for searching a database for modification methods for the HTML element that needs to be modified located by the modification element locating section; and a display control section for outputting the HTML element that needs to be modified and the modification methods retrieved by the modification method retrieval section on a display.

Another example embodiment of the present invention is implemented as a data editing method for editing certain data by using a computer. The method comprises the steps of: generating an image by rendering the data and storing the image in a certain storage; performing image processing on the image stored in the storage to simulate how the image is viewed under a certain visual characteristic; locating a modification portion that needs to be modified in the data, the step of locating being based on a result of the simulation on the image; and modifying the located modification portion located by locating the modification portion in the data.

BRIEF DESCRIPTION OF THE DRAWINGS

For a more complete understanding of the present invention and the advantages thereof, reference is now made to the following description taken in conjunction with the accompanying drawings, in which:

FIG. 1 schematically shows an exemplary hardware configuration of a computer for implementing a data editing apparatus according to an embodiment;

FIG. 2 shows a functional configuration of the data editing apparatus according to the embodiment;

FIG. 3 shows an example of data stored in a symptom model storage section according to the embodiment;

FIG. 4 shows a configuration of an image processing section according to the embodiment;

FIG. 5 is a flowchart describing processing of an image quality determining section on the original image;

FIG. 6 is a flowchart describing processing of the image quality determining section on the simulation image;

FIG. 7 shows an example of thinning and computation of the connectivity number;

FIG. 8 shows a configuration of a result presentation section according to the embodiment;

FIG. 9 is a flowchart describing a flow of data editing according to the embodiment;

FIG. 10 shows an alternative configuration of the data editing apparatus according to the embodiment;

FIG. 11 shows a configuration of an HTML analysis section in the data editing apparatus configured as in FIG. 10;

FIG. 12 shows a configuration of a result presentation section in the data editing apparatus configured as in FIG. 10;

FIG. 13 shows a flowchart describing a flow of data editing in the data editing apparatus configured as in FIG. 10, and preliminary processing;

FIG. 14 shows a flowchart describing a flow of data editing in the data editing apparatus configured as in FIG. 10, and processing for an HTML document;

FIG. 15 shows a variation in configuration of the image processing section;

FIG. 16 shows a variation in configuration of a result presentation section; and FIG. 17 shows another variation in configuration of a result presentation section.

DESCRIPTION OF SYMBOLS

10 . . . Symptom model storage section
20 . . . Rendering section
30 . . . Image processing section
31 . . . Image quality changing section
32 . . . Image quality determining section
40 . . . Result presentation section
41 . . . Modification element locating section
42 . . . Modification method retrieval section
43 . . . Display control section
44 . . . Priority determining section
50 . . . Document modification processing section
60 . . . Character font database
70 . . . Font evaluation result database
80 . . . HTML document analysis section
101 . . . CPU
103 . . . Main memory
105 . . . Hard disk
106 . . . Network interface
109 . . . Keyboard/mouse

DETAILED DESCRIPTION OF THE INVENTION

The present invention provides an ability to analyze the readability of an image to be displayed on a screen, such as a web page, and appropriately modify the image. The invention also provides a data editing system for supporting creation of a screen that is easy to view for a user having trouble with his/her eyesight, such as a visually impaired person or an aged person.

In one embodiment, the invention is implemented as a data editing apparatus comprising: a rendering section for generating an image by rendering certain data; an image processing section for performing image processing on the image generated by the rendering section to simulate how the image is viewed under a certain visual characteristic; a modification portion locating section for locating a modification portion that needs to be modified in the data, the step of locating being based on a processing result of the image processing section; and a modification processing section for modifying the modification portion in the data located by the modification portion locating section.

In some embodiments, the image processing section comprises: an image quality changing section for changing the quality of the image generated by the rendering section, the change being made according to the visual characteristic; and an image quality determining section for determining the quality of the image processed by the image quality changing section. Further specifically, the image quality determining section determines the degree to which the shape of elements in the image generated by the rendering section is preserved in the image processed by the image quality changing section. It also evaluates the difference of color between predetermined elements and their adjacent part in the image processed by the image quality changing section.

The data editing apparatus may further comprise a modification method retrieval section for searching a database for modification methods for the modification portion located by the modification portion locating section. The modification processing section modifies the modification portion located by the modification portion locating section according to a modification method selected from the modification methods retrieved by the modification method retrieval section.

Another example of a data editing apparatus according to this invention comprises: a rendering section for generating an image by rendering an HTML document; an image processing section for performing image processing on the image generated by the rendering section and evaluating the processed image; a modification element locating section for locating an HTML element that needs to be modified in the HTML document to be modified, the step of locating being based on an evaluation result of the image processing section; a modification method retrieval section for searching a database for modification methods for the HTML element that needs to be modified located by the modification element locating section; and a display control section for outputting the HTML element that needs to be modified and the modification methods retrieved by the modification method retrieval section on a display.

The data editing apparatus may comprise a document modification processing section for actually modifying the HTML document to be processed. For example, the document modification processing section modifies a description of the HTML element that needs to be modified in the HTML document to be processed according to a modification method selected from the modification methods retrieved by the modification method retrieval section. Alternatively, it may automatically modify the description of the HTML element that needs to be modified according to a preset modification method.

Thus the present invention provides a data editing apparatus comprising sections stored on a computer readable medium. The sections include: a rendering section for generating an image by rendering certain data of an electronic document; an image processing section for performing image processing on the image generated by the rendering section to simulate how the image is viewed under a certain visual characteristic; a modification element locating section for locating a modification portion in creation data based on a processing result of the image processing section; and a modification processing section for modifying the modification portion in the creation data located by the modification element locating section. The sections are for enabling particular readability of the certain data on a display.

Another example of a data editing apparatus according to this invention comprises: a database that stores a processing result for each character that constitutes a character font set, the processing result being obtained by performing image processing on a raster image of each character to simulate how the image is viewed under a certain visual characteristic; an HTML analysis section for analyzing an HTML document to be processed and retrieving processing results for characters corresponding to characters contained in the HTML document from the database; and a modification element locating section for locating an HTML element that needs to be modified in the HTML document to be processed, the step of locating being based on the processing results for the characters retrieved by the HTML analysis section.

The data editing apparatus may further comprise: a rendering section for generating an image by rendering an HTML document; and an image processing section for performing image processing on the image generated by the rendering section to simulate how the image is viewed under a certain visual characteristic. The modification element locating section may locate the HTML element that needs to be modified in all or part of the HTML document being processed, the step of locating being based on the processing results for the characters retrieved by the HTML analysis section or based on a processing result of the image processing section.

This invention may also be implemented as a data editing method for editing certain data by using a computer. The method comprises the steps of: generating an image by rendering the data and storing the image in a certain storage; performing image processing on the image stored in the storage to simulate how the image is viewed under a certain visual characteristic; locating a modification portion that needs to be modified in the data, the step of locating being based on a result of the simulation on the image; and modifying the located modification portion located by locating the modification portion in the data.

Another embodiment of a data editing method according to this invention comprises the steps of: analyzing an HTML document to be processed; retrieving processing results for characters corresponding to characters contained in the HTML document from a certain storage that stores a processing result for each character that constitutes a certain character font set, the processing result being obtained by performing image processing on a raster image of each character to simulate how the image is viewed under a certain visual characteristic; locating an HTML element that needs to be modified in the HTML document, the step of locating being based on the retrieved processing results for the characters; and modifying the HTML document to be processed based on the result of locating the HTML element that needs to be modified.

This invention may further be implemented as a program for controlling a computer and causing the computer to implement the functions of the above described data editing apparatus, or causing the computer to execute processing corresponding to the steps in the above described data editing method. The program may be provided by distributing in the form of a magnetic disk, optical disk, semiconductor memory, or other recording media, or by distributing over a network.

Now, this invention will be described in detail based on an advantageous embodiment illustrated in the appended drawings. This invention simulates how a screen is viewed by a user having trouble with his/her eyesight, such as a visually impaired person or an aged person, by rendering an HTML document to be processed and actually generating an image of the document, which is then subjected to image processing according to a specific visual symptom (e.g., decreased focusing ability such as myopia and presbyopia, or color vision deficiency). The image is then analyzed to determine how it can be modified to improve the readability. Thus, this invention supports a web page creator in creating a web page.

Here, the "web page creator" is not limited to be a person who creates the original web page to be processed. Rather, it includes those who check the accessibility of the web page and modify the web page, such as a website accessibility supervisor. In addition, the visual "symptom" may be a single symptom or a combination of several symptoms.

This embodiment aims at improving the readability of a raster image of a web page obtained by rendering an HTML document, and it mainly addresses the legibility of characters on the web page. The legibility of a character on the web page is determined based on the difference between the foreground color and the background color, and on whether the character shape is preserved on the web page after image processing (simulation). That is, if the difference between the foreground color and the background color is small or if the character shape has changed on the web page after the image processing, the character is considered illegible for a user who has a symptom simulated by the image processing.

FIG. 1 schematically shows an exemplary hardware configuration of a computer for implementing a data editing apparatus according to this embodiment. The computer shown in FIG. 1 includes a CPU (Central Processing Section) 101 as operation means; main memory 103 connected to the CPU 101 via a M/B (motherboard) chipset 102 and a CPU bus; a video card 104 also connected to the CPU 101 via the M/B chipset 102 and an AGP (Accelerated Graphics Port); a display device 110 connected to the video card 104; a hard disk 105 and a network interface 106 connected to the M/B chipset 102 via a PCI (Peripheral Component Interconnect) bus; and a floppy disk drive 108 and a keyboard/mouse 109 connected to the M/B chipset 102 via the PCI bus, a bridge circuit 107, and a low-speed bus such as an ISA (Industry Standard Architecture) bus. This embodiment can be implemented by computer program. The computer program is loaded in main memory 103 from hard disk 105, floppy® disk drive 108 or the other recording medium and CPU 101 implements this embodiment.

FIG. 1 is a mere illustration of a hardware configuration of the computer for implementing this embodiment, and various other configurations are possible as long as the concepts of this invention can be applied to them. For example, the computer may be provided with only video memory instead of the video card 104, in which case the CPU 101 processes image data. The computer may also be provided with a CD-R (Compact Disc Recordable) drive or a DVD-RAM (Digital Versatile Disc Random Access Memory) drive via an interface such as ATA (AT Attachment) or SCSI (Small Computer System Interface) as an external storage.

FIG. 2 shows a functional configuration of the data editing apparatus according to this embodiment implemented in the computer as shown in FIG. 1. With reference to FIG. 2, the data editing apparatus of this embodiment includes a symptom model storage section 10 that stores symptom models; a rendering section 20 for generating an image from an HTML document to be processed; an image processing section 30 for performing image processing; a result presentation section 40 for presenting the result of the image processing; and a document modification processing section 50 for modifying the HTML document to be processed.

In the configuration of FIG. 2, the symptom model storage section 10 is implemented by storage, for example, the main memory 103 or the hard disk 105 shown in FIG. 1. The rendering section 20, the image processing section 30, and the document modification processing section 50 are software blocks performed by the program-controlled CPU 101. The result presentation section 40 is performed, for example, by the program-controlled CPU. 101 in combination with the video card 104 and display device 110 for displaying the image. The program for controlling the CPU 101 to perform these functions may be provided by distributing in the form of a magnetic disk, optical disk, semiconductor memory, or other recording media, or by distributing over a network.

The symptom model storage section 10 contains models of visual characteristics of users having trouble with their eyesight, such as visually impaired people and senior citizens. That is, models of symptoms such as "decreased focusing ability (myopia, presbyopia)" and "color vision deficiency" are set in it (symptom models). For each symptom model, it stores the following information:

(a) a method of image quality degradation processing for simulating visual degradation using an image, and a parameter for the method (b) methods for modifying an HTML document if the image obtained by the simulation is hard to view FIG. 3 shows an example of data stored in the symptom model storage section 10. In the example shown in FIG. 3, a symptom name, a phenomenon indicating the symptom, an image processing (simulation) method, and modification methods are stored for each of various symptoms. For example, for a symptom of decreased focusing ability observed in myopia and presbyopia, the following information is stored: the name "decreased focusing ability (myopia, presbyopia); the phenomenon "image formed on the retina blurs"; the processing "convolute a cylindrical function representing the blur" as the image processing method to simulating this symptom (the parameter for this processing is the radius of the cylinder); and three methods for providing a screen easily viewed by a user having this symptom "enlarge characters", "change the font into a sans serif font", and "increase line spacing."

The rendering section 20 generates an image by rendering an HTML document to be processed. The generated image is stored in, for example, a work area of the main memory 103 or of the video memory in the video card 104 shown in FIG. 1. In rendering, correspondences between HTML elements and their positions in the image (coordinate values) are also obtained and stored in storage means such as the main memory 103 shown in FIG. 1. The functions of the rendering section 20 may be implemented by a conventional technique such as a rendering engine of a web browser.

The image processing section 30, based on a symptom to be addressed and its degree indicated by a person such as a web page creator, retrieves the "image processing method" for the symptom from the symptom model storage section 10. The image processing section 30 then performs image quality degradation processing on the image (original image) generated by the rendering section 20 to generate an image that simulates the visual degradation (simulation image). The generated simulation image is stored in, for example, a work area of the main memory 103 or of the video memory in the video card 104, or in storage means such as the hard disk 105, shown in FIG. 1. The image processing section 30 analyzes each of the original image and simulation image stored in the memory and compares the results. The comparison result is passed to the result presentation section 40. The details of functions of the image processing section 30 will be described later.

The result presentation section 40 locates HTML elements that may cause problems in viewing the image rendered from the HTML document. This location is based on the comparison result between the original image and the simulation image provided by the image processing section 30, and information on the correspondences between the HTML elements and their positions (coordinates) in the image provided by the rendering section 20 (referred to as coordinates-elements correspondence information hereafter). The result presentation section 40 also retrieves the modification methods for the symptom from the symptom model storage section 10. Then, for all or part of the problematic HTML elements, the result presentation section 40 lists the modification methods along with their positions to present them to the web page creator on a display, for example, the display device 110 shown in FIG. 1. The web page creator can select and indicate one or more of the listed modification methods. This information (the positions of the problematic HTML elements and the modification methods) is also passed to the document modification processing section 50. The details of functions of the result presentation section 40 will be described later.

The document modification processing section 50 applies the modification method specified by the web page creator or by the system to the problematic HTML elements located by the result presentation section 40 and modifies the HTML document to be processed.

The HTML document modified by the document modification processing section 50 is recursively sent to the rendering section 20. Thus, a processing loop is formed by the processing of the rendering section 20, the image processing section 30, the result presentation section 40, and the document modification processing section 50. Repeating this processing loop can progressively improve the HTML document.

Now, the image processing section 30 and the result presentation section 40 will be described in more detail. FIG. 4 shows a configuration of the image processing section 30. With reference to FIG. 4, the image processing section 30 includes an image quality changing section 31 for simulating the eyesight of a person such as a visually impaired person or an aged person, and an image quality determining section 32 for determining the quality of the simulation image and for determining portions that are hard to view.

The image quality changing section 31 retrieves an image processing method and its parameter from the symptom model storage section 10 correspondingly to a symptom and its degree specified by the web page creator inputting a command or otherwise. The image quality changing section 31 then generates a simulation image by applying image processing based on the image processing method to the original image generated by the rendering section 20.

The symptom intended to be addressed and its degree may be specified by, for example, the web page creator inputting a predetermined command with an input device such as the keyboard/mouse 109 shown in FIG. 1. Alternatively, a user interface screen that lists symptom names stored in the symptom model storage section 10 may be displayed on the display device 110. The user interface may prompt the web page creator to select a symptom in the list and to further input a parameter specifying the degree of the symptom. (For example, as shown in FIG. 2, the parameter for "decreased focusing ability" may be the eyesight that can be converted into the radius of the cylinder based on a standard web page browsing environment. The parameter for "color vision deficiency" may be the type of the color vision deficiency that can be converted into a confusion line diagram.) In addition, if the use of the data editing apparatus is limited to a specific application, the symptom and its parameter may be preset so that a predetermined image processing is automatically performed on the original image rendered from the HTML document.

The image quality determining section 32 analyzes the original image generated by the rendering section 20 and the simulation image generated by the image quality changing section 31 to determine and compare their respective characteristics. The image quality determining section 32 also evaluates the differences between the color of elements in the simulation image (foreground color) and the color of their adjacent part (background color). This processing allows determination of portions in the original image that are hard to view for the user having the symptom given as a condition for processing of the image quality changing section 31. The operation of the image quality determining section 32 will be described in more detail below using a flowchart.

FIG. 5 is a flowchart describing the processing of the image quality determining section 32 on the original image. As shown in FIG. 5, the image quality determining section 32 first generates an occurrence histogram of colors in the input original image (step 501). It then sequentially focuses its attention on each color occurring in the image and generates a binary image using the color as the foreground color and the other colors as the background color. The image quality determining section 32 then discovers connected components (step 502). Because the text in the HTML document is represented in a single color, this operation allows a character or part of a character to be extracted as a connected component. This processing may be applied to all colors occurring in the image or to only highly ranked colors in the occurrence histogram.

A possible variation of this discovery of connected components involves using connected components occupying a large amount of areas in the image as the background and connected components of other colors surrounded by the background connected components as the foreground and discovering connected components again. There may be a case where each character written in an image (e.g., characters on an icon) in the HTML document is not represented in a single color due to gradation. Even in this case, this alternative processing allows the character or part of the character to be extracted as a connected component if the background is represented in a single color. The discovery of connected components may use any technique known in the art of image processing.

The image quality determining section 32 then eliminates those that are not regarded as a character from the connected components extracted in step 502 based on their dimension, ratio between their height and width, or other features (step 503). Because determination of readability in this embodiment mainly concerns characters, this post processing is performed for excluding elements (HTML elements) other than characters from consideration. Sometimes several characters may be extracted as one large connected component by a cause such as an underline representing a link in the web page. Therefore, the image quality determining section 32 obtains the connected components representing characters by detecting and eliminating such underlines based on whether a connected component has an underline in the bottom or based on the ratio between its height and width. Depending on the purpose of use of the data editing apparatus, elements other than characters may also need to be modified at portions that are hard to view. In that case, the processing of this step may be skipped.

Next, the image quality determining section 32 performs thinning of each obtained connected component (step 504). The image quality determining section 32 then extracts characteristic points from the thinned connected components (step 505). Exemplary characteristic points are points where the connectivity number is zero, one, three, or four. The connectivity number indicates the number of points passed when the outline of a connected component is traced.

FIG. 7 shows an example of thinning and computation of the connectivity number. FIG. 7(*a*) shows a binary image of the original image. In the figure, "1s" represent foreground pixels, and "0s" represent background pixels. FIG. 7(*b*) shows the result of thinning of the foreground pixel part in the original image of FIG. 7(*a*). FIG. 7(*c*) shows the result of determining the connectivity number for each foreground pixel in the binary image of FIG. 7(*b*). In FIG. 7(*c*), each number denotes the connectivity number. A symbol "#" denotes a pixel whose connectivity number is two. A symbol "." denotes a background pixel. As shown, points whose connectivity numbers are zero, one, three, or four represent the characteristics of how the connected component is connected. The upper and leftmost pixel in the connected component, although its connectivity number is two, is a useful characteristic in that it represents the top position of the connected component. Thus, the points represented as numbers in FIG. 7(c) can be extracted as the characteristic points. The thinning and extraction of the characteristic points may be performed using a technique known in the art of image processing. Finally, the image quality determining section 32 stores the position, shape, and characteristic points of each connected component obtained in the processing up to step 503 in storage means, for example, the main memory 103 shown in FIG. 1 (step 506).

FIG. 6 is a flowchart describing the processing of the image quality determining section 32 on the simulation image. As shown in FIG. 6, for each connected component in the original image, the image quality determining section 32 initially cuts out a partial image located at a corresponding position in the simulation image (step 601) based on the information on the position of the connected component in the original image stored in certain storage means in step 506 in FIG. 5. For example, the partial image to be cut out may be a minimum rectangular containing the connected component. If the simulation image involves blur or the like, the connected component will expand to occupy larger area than in the original image. Therefore, the amount of area to be cut out is appropriately adjusted such as according to the degree of blur based on a parameter.

Next, the image quality determining section 32 checks the color difference between pixels likely to be the foreground and pixels likely to be the background in the partial image cut out from the simulation image (step 602). This is done based on the shape of the connected component in the original image stored in certain storage means in step 506 of FIG. 5. If the color difference of pixels between these adjacent elements or portions is smaller than a certain degree, the portion in question is determined as hard to view. When the visual symptom simulated in the simulation image is color vision deficiency, the color difference along a confusion line is hard to recognize, so that it may be determined that the position is hard to view even if there is a color difference on the line.

Here, the color difference will be described. Colors may be represented in various ways, such as by luminance, saturation, and hue, or by RGB (Red, Green, and Blue: the primary colors of light). For example, consider the case where colors are represented by L*a*b* color system. L*a*b* color system represents a color with three values of L*, a*, and b*, where L* indicates luminance, and a* and b* indicate perceptible color values as a total of hue and saturation.

If the color of pixels considered as the foreground and the color of pixels considered as the background are (L1, a1, b1) and (L2, a2, b2) respectively, the color difference ΔE and the luminance difference ΔL between the two colors are represented as follows.

$$\Delta E = ((L1-L2)^2 + (a1-a2)^2 + (b1-b2)^2)^{1/2}$$

$$\Delta L = L1 - L2$$

Then, appropriate values are set. For example, if $$\Delta E < 100.0 \text{ and } |\Delta L| < 30.0,$$

then it can be determined that the color difference is small and the two colors are hard to distinguish from each other, that is, that portion is hard to view.

If it is determined that the difference between the foreground color and the background color is above a certain degree in step 602, then the image quality determining section 32 generates a binary image of the partial image by setting an appropriate threshold (step 603). The threshold may be set by using a technique known in the art, such as an automatic technique or by using an occurrence histogram of colors. For example, the threshold may be set automatically by the following manner. A pixel considered as the foreground is chosen and its color is determined, and a pixel considered as the background is chosen and its color is determined. Computation is performed to approximate all other pixels to one of the two colors, so that each pixel is converted into a binary value of the closer color. To determine the "closeness" of color, the color difference in the above described L*a*b* space may be used. Alternatively, the distance in the RGB space may simply be used. When the occurrence histogram of colors is used, the histogram of colors taken for all pixels in the partial image to be processed tends to show two peaks (corresponding to the foreground and the background). The slopes are gentle for a blurred image, while steep for a clear image (the values concentrates to a particular color). Then, a trough between the two peaks can be found and set as the threshold that divides the color space into two halves for generating a binary image.

The image quality determining section 32 then discovers connected components in the binary image (step 604), performs thinning of the obtained connected components (step 605), and further extracts characteristic points from the result of thinning (step 606).

Finally, the image quality determining section 32 compares the information on the character points of each connected component in the original image stored in certain storage means in step 506 of FIG. 5 with the character points of each corresponding connected component in the simulation image extracted in the step 606 (step 607). If the positions and details of the character points are preserved in the simulation image as well, it is determined that the original image is not hard to view despite the visual symptom simulated in the simulation image. On the other hand, if the positions or details of the character points are not preserved in the simulation image, it is determined that the original image is hard to view for a user having the visual symptom simulated in the simulation image. It is noted that, depending on the result of thinning, the characteristic points may not exist at exactly the same position in the original and simulation images. Therefore, a threshold may be set in advance such that if each characteristic point in the original and simulation images exists closer to each other than the threshold, it can determined that the position of the characteristic is preserved.

Now, the result presentation section 40 will be described. FIG. 8 shows a configuration of the result presentation section 40. With reference to FIG. 8, the result presentation section 40 includes a modification element locating section 41 for locating HTML elements that need to be modified; a modification method retrieval section 42 for searching for modification methods for the HTML elements located by the modification element locating section 41; and a display control section 43 for presenting to the web page creator the modification methods for the HTML elements retrieved by the modification method retrieval section 42.

The modification element locating section 41 is a means for locating portions that need to be modified in the HTML document. That is, it obtains the positions of connected components that are hard to view as determined by the image quality determining section 32 of the image processing section 30. It then locates HTML elements that need to be modified based on the coordinates-elements correspondence information previously obtained and stored in certain storage means by the rendering section 20.

The modification method retrieval section 42 searches the symptom model storage section 10 and retrieves modification methods for the visual symptom used in the simulation by the image quality changing section 31 of the image processing section 30. It then passes to the display control section 43 information on the retrieved modification methods and on the HTML elements to which the modification methods are applied. This information is also passed to the document modification processing section 50.

The display control section 43 lists the HTML elements and the corresponding modification methods received from the modification method retrieval section 42. The display control section 43 generates a user interface screen with input means such as checkboxes and presents it to the web page creator on a display, for example, the display device 110 of FIG. 1.

The web page creator can specify a modification method for the HTML document by performing a predetermined input on the user interface screen. Examples of the user interface screen display may include a web page screen (original screen) generated from the HTML document to be processed, on which the problematic HTML elements are displayed with their color inverted. The web page creator may then click on an HTML element to display modification methods for that HTML element. The information on a modification method specified by the web page creator among the modification methods listed by display control of the display control section 43 is sent to the document modification processing section 50.

Now, an overall flow of editing data of a web page according to this embodiment will be described. FIG. 9 is a flowchart describing the flow of data editing according to this embodiment. As shown in FIG. 9, all or part of an HTML document to be processed is read into the data editing apparatus of this embodiment. The rendering section 20 generates an original raster image by rendering the HTML document (step 901). Here, as described above, the rendering section 20 obtains the correspondences between HTML elements in the web page and their coordinates in the generated original image and stores them in certain storage means. The generated original image is also displayed on a display device, such as the display device 110 shown in FIG. 1. The data editing apparatus then waits for a direction to modify the image from the web page creator.

When the web page creator inputs a direction to modify the image, the image quality changing section 31 of the image processing section 30 responds to the direction and performs image processing. That is, the original image generated in step 901 is subjected to image processing corresponding to a symptom specified by the direction, and a simulation image is generated (step 902). The image quality determining section 32 analyzes the original image and the simulation image and compares the analyzed results. Thus, portions that are hard to view for a user having the symptom simulated in the simulation image are detected (step 903).

Next, the modification element locating section 41 of the result presentation section 40 locates problematic HTML elements (i.e., that make the web page hard to view) as portions that need to be modified (step 904) based on the coordinates of the portions detected in step 903. Then, the modification method retrieval section 42 and the display control section 43 present modification methods for the HTML document to the web page creator (step 905).

When the web page creator selects a desired one or more of the presented modification methods and inputs a direction, the document modification processing section 50 modifies the HTML document according to the directed modification method(s) (step 906, 907). The process returns to step 901 and repeats the data editing by using a raster image of the modified HTML document as the original image. Repeating the above process can progressively improve the readability of the web page resulting from the HTML document. In step 906, if the web page creator determines that no more modification of the HTML document is required, the data editing is terminated by an input of a termination command or otherwise.

Various symptoms can be observed as visual characteristics of visually impaired people and senior citizens, and sometimes they have multiple symptoms. Now, addressing a plurality of symptoms in this embodiment will be described.

For a user having a plurality of symptoms, image processing is performed that combines a plurality of corresponding symptoms. In this case, the "image processing method" of the symptom model will be a combination of image processing methods for the corresponding symptoms. The "modification method" of the symptom model will also be a combination of modification methods for the combined symptoms.

Instead of combining information on a plurality of symptoms, it is also possible to simultaneously address a plurality of symptoms in parallel in one modification processing. In this case, the image processing section 30 performs the image quality degradation processing as many times as the number of symptoms to be addressed, thereby comparing image characteristics for each degradation result. Also in this case, the result presentation section 40 has to present the modification methods along with information about which symptom each modification method corresponds to.

Thus, in this example embodiment, an HTML document is rendered into an actual image, for which image processing is performed that simulates visual characteristics of a user such as a visually impaired person or an aged person. From analysis and comparison of the original image and the simulation image, it is determined how the image is viewed by the user having the visual characteristics simulated in the simulation image, and whether there are portions that are hard to view in the image. Appropriate modification methods are then presented according to various visual characteristics. Therefore, detailed directions are provided about how to modify the image so that the user having trouble with his/her eyesight can easily view the image. This can effectively support web page creation.

Now, an alternative configuration of the data editing apparatus according to this embodiment will be described. In this alternative embodiment, the readability of an image of a web page is determined mainly based on how characters appear on the web page. Furthermore, a text in an HTML document is displayed after converted into an image (converted into a bitmap) according to character font information included in a browser. Therefore, the above described image processing may be performed in advance for each character constituting character font sets that are probably used on web pages. It is then possible to determine which portions are hard to view without rendering the entire HTML document. This eliminates the process steps required for rendering and enables faster processing in comparison with the case of rendering the entire HTML document.

FIG. 10 shows this alternative configuration of the data editing apparatus according to this embodiment. The data editing apparatus shown in FIG. 10 includes a symptom model storage section 10 that stores symptom models; a rendering section 20 for generating an image from an HTML document to be processed; an image processing section 30 for performing image processing; a result presentation section 40 for presenting the result of the image processing; a document modification processing section 50 for modifying the HTML document to be processed; a character font database 60 that stores character font sets; a font evaluation result database 70 that stores an evaluation result for each character in the character font sets; and an HTML analysis section 80 for analyzing the HTML document to be processed and for selecting the way now image processing method are applied.

In the configuration of FIG. 10, the symptom model storage section 10, the rendering section 20, the image processing section 30, the result presentation section 40, and the document modification processing section 50 are similar to the respective components shown in FIG. 2. Therefore, these sections are given the same numerals and the descriptions in FIG. 2 apply to them as well.

The character font database 60 and the font evaluation result database 70 are implemented by storage, for example, the main memory 103 or the hard disk 105 shown in FIG. 1. The HTML analysis section 80 is a software block performed by, for example, the CPU 101 shown in FIG. 1. The character font database 60 stores typical character font sets that are probably used on web pages. Before performing data editing according to this embodiment for a particular HTML document, the data editing apparatus processes all characters that constitute these typical character font sets. That is, it renders the characters, applies processing of the image processing section 30, and evaluates the readability of the individual characters for each symptoms stored in the symptom model storage section 10. Because various font sets are used in web pages and it is unrealistic to accommodate all font sets, only typical character font sets frequently used, such as Mincho type and gothic type, are stored in the character font database 60 and evaluated.

The font evaluation result database 70 stores evaluation results obtained from processing of the image processing section 30 for each character that constitutes the typical character font sets. In response to a query from a constituent character evaluation section 83 of the HTML analysis section 80 (to be described later), the font evaluation result database 70 returns evaluation results as to whether characters in a character font set appearing in the HTML document are hard to view for a person having a specified symptom. For a query about a character font set having shapes similar to a typical character font set, the evaluation results of that character font set may be substituted with those of the typical character font set.

The HTML analysis section 80 analyzes the HTML document to be processed and investigates the style of the HTML document. Based on the analysis, it determines how to apply image processing by the data editing apparatus.

FIG. 11 shows a configuration of the HTML analysis section 80. With reference to FIG. 11, the HTML analysis section 80 includes a constituent element analysis section 81 for analyzing HTML elements that constitute the HTML document; an HTML portion extraction section 82 for extracting portions of the HTML document to which image processing are applied; and a constituent character evaluation section 83 for evaluation using the font evaluation result database 70 provided in advance for characters on web pages.

The constituent element analysis section 81 analyzes the HTML document to be processed and investigates the type and layout of all HTML elements that constitute the HTML document. Then, to determine the readability of the web page to be generated from the HTML document, it determines whether to (1) entirely perform rendering and image processing,
(2) partially perform rendering and image processing, or
(3) perform no rendering and image processing at all.

For example, if a background image is used in the entire web page and can interfere with characters, it is determined that rendering and image processing are required for the entire HTML document. If the web page does not contain a background image over the web page but partially contains images, it is determined that rendering and image processing for the relevant portions are appropriate. If the HTML document contains only characters, it is determined that no rendering and image processing is required.

As a result of the analysis of the HTML document to be processed, if the constituent element analysis section 81 determines that rendering and image processing of the entire HTML document is required, it passes the entire HTML document to the rendering section 20. Further processing of the HTML document is the same as that described with reference to the flowchart of FIG. 9. That is, the rendering section 20 generates the original image, and the image processing section 30 generates the simulation image and further compares the original image with the simulation image to detect portions that are hard to view. The result presentation section 40 locates problematic HTML elements, and the document modification processing section 50 modifies the HTML document based on a direction from the web page creator.

If the constituent element analysis section 81 determines that rendering and image processing of part of HTML document is appropriate, it passes the analysis result including information that specifies portions that require rendering and image processing to the HTML portion extraction section 82 along with the HTML document. It also passes the analysis result including information that specifies the other portions in the HTML document to the constituent character evaluation section 83 along with the HTML document. It then transfers the process to the HTML portion extraction section 82 and the constituent character evaluation section 83. If the constituent element analysis section 81 determines that no rendering and image processing of the HTML document is required, it passes the HTML document to the constituent character evaluation section 83 and transfers the process to the constituent character evaluation section 83.

The HTML portion extraction section 82, based on the analysis result of the constituent element analysis section 81, extracts the HTML elements that require rendering and image processing from the HTML document to be processed and passes the HTML elements to the rendering section 20. Further processing of these relevant portions of the HTML document is the same as that described with reference to the flowchart of FIG. 9.

The constituent character evaluation section 83 queries the font evaluation result database 70 about all characters that constitute the HTML document, or only those characters at the portions that require no rendering and image processing based on the analysis result of the constituent element analysis section 81. Based on the character font and the symptom, it obtains evaluation information on the readability of the characters that would be achieved if the characters were actually rendered, thereby evaluating the readability of the characters. The evaluation result is sent to the result presentation section 40 on the basis of HTML elements made up of the characters.

FIG. 12 shows a configuration of the result presentation section 40 in the data editing apparatus configured according to FIG. 10. The result presentation section 40 shown in FIG. 12 has the same functions as those of the result presentation section 40 shown in FIG. 8. In addition, the modification method retrieval section 42 can receive input of the evaluation result of the constituent character evaluation section 83 obtained by using the font evaluation result database 70. Therefore, if the evaluation result is received from the constituent character evaluation section 83, the modification element locating section 41 does not need to locate the HTML elements that need to be modified based on the determination of the image processing section 30 and the image-element correspondence information obtained by the rendering section 20. Rather, the modification search section 42 directly searches the symptom model storage section 10 for corresponding modification methods based on the obtained evaluation result.

FIGS. 13 and 14 are flowcharts describing a flow of data editing in the data editing apparatus configured as shown in FIG. 10. In this data editing apparatus, preliminary operation shown in FIG. 13 is performed before editing data of a certain HTML document to be processed. First, characters of the character font sets stored in the character font database 60 are read, and images of them are generated and passed to the image processing section 30 (step 1301). These original images of the characters are then subjected to image quality degradation processing corresponding to a particular symptom according to an image processing method stored in the symptom model storage section 10. Thus, simulation images are generated (step 1302). The image processing section 30 analyzes each of the original images and the simulation images and compares the results of the analyses to evaluate whether each character is hard to view for a user having the simulated symptom (step 1303). The evaluation results are stored in the font evaluation result database 70 (step 1304).

As shown in FIG. 14, when all or part of the HTML document to be processed is read into the data editing apparatus of this embodiment, the HTML analysis section 80 first analyzes the HTML document (step 1401). Thus, it is determined whether the evaluation is made by rendering and image processing, or by the constituent character evaluation section 83, or which portions of the HTML document are evaluated and in which way the portions are evaluated (step 1402). The following operation will be described for the case where the determination of step 1402 is performed on the basis of portions (HTML elements) of the HTML document. If the analysis of the HTML analysis section 80 determines that the entire HTML document should be evaluated by rendering and image processing or by the constituent character evaluation section 83, one of the following processes will be performed for the entire HTML document.

For HTML elements determined to be evaluated by the rendering and image processing, the HTML elements are processed in the same manner as in steps 901-904 of FIG. 9. That is, the processing includes generating an original image by rendering (step 1403), generating a simulation image by the image quality changing section 31 of the image processing section 30 (step 1404), detecting portions that are hard to view for the user having the symptom simulated in the simulation image (step 1405), and locating portions (HTML elements) that need to be modified (step 1406). On the other hand, for HTML elements determined to be evaluated by the constituent character evaluation section 83 (i.e., characters), portions evaluated as hard to view are determined (step 1407) based on the information of evaluation results stored in the font evaluation result database 70 in advance through the procedure shown in FIG. 13. Then, the modification method retrieval section 42 of the result presentation section 40 retrieves modification methods for the HTML document from the symptom model storage section 10, and the display control section 43 presents them to the web page creator (step 1408).

When the web page creator selects a desired one or more of the presented modification methods and inputs a direction, the document modification processing section 50 modifies the HTML document according to the direction of the modification method(s). (steps 1409, 1410). The process returns to step 1401 and repeats the data editing. In step 1409, if the web page creator determines that no more modification of the HTML document is required, the data edit processing is terminated by an input of a termination command or otherwise.

Thus, in the data editing apparatus configured as shown in FIG. 10, character font sets used in web pages are previously rendered into images and evaluated for their readability, the results of which are then stored. If all or part of a web page to be processed contains only characters and does not need to be separated into the foreground and the background, the stored evaluation results are used to search for modification methods. This enables data editing without need of rendering of the entire HTML document every time, so that faster processing can be expected.

The data editing apparatus shown in FIG. 2 or 10 generates a simulation image for comparison with an original image by the image quality determining section 32 of the image processing section 30. This simulation image may also be presented to the web page creator.

FIGS. 15 and 16 shows a variation in configuration of the image processing section 30 and the result presentation section 40 in this case. As shown in FIG. 15, the image quality changing section 31 of the image processing section 30 passes the generated simulation image to the image quality determining section 32 as well as to the result presentation section 40. Then, as shown in FIG. 16, the display control section 43 of the display presentation section 40 receives the simulation image from the image processing section 30 and presents it to the web page creator on a display, for example, the display device 110 of FIG. 1. Thus, presenting the simulation image to the web page creator can provide the creator with a deep understanding on how the web page is viewed by a visually impaired person or an aged person. In addition, by looking at portions that need to be modified in combination with the simulation image, the web page creator can obtain information for accurately determining how to modify the HTML document.

Depending on the content of the web page to be processed, a large number of modifications may be presented by the result presentation section 40 (the number of HTML elements that need to be modified×the number of modification methods for each HTML element). This situation can be efficiently addressed by prioritizing processing items.

FIG. 17 shows a variation in configuration of the result presentation section 40 in this case. As shown in FIG. 17, the result presentation section 40 includes a modification element locating section 41, a modification method retrieval section 42, a display control section 43, as well as a priority determining section 44.

Based on a predetermined priority criterion, the priority determining section 44 determines the priority of HTML elements that need to be modified as located by the modification element locating section 41. The priority is used to determine the order in which modification methods are searched for by the modification method retrieval section 42, and the order in which the modification methods are displayed by the display control section 43.

Examples of priority criteria may include the following.
- the type of HTML elements that need to be modified (e.g., an <H1< tag is given a high priority)
- the position of HTML elements that need to be modified in the web page (e.g., higher priority is given near the center of the web page, and lower priority is given on the periphery)
- the number or amount of area of modification portions in an HTML element that need to be modified (e.g., an HTML element with many modification portions or with a large area of modification portions is given a high priority)
- the priority that is set for each symptom Each criterion may be used by itself or in combination with other criterion. When several criteria are combined for determination of priority, each criterion may be given a different weight. Providing such priority allows display control, such as presenting the modification portions and modification methods listed according to priority, neglecting HTML elements with priority below a certain threshold (not presenting as modification portions), and so on. Therefore, if a large number of modifications occur, it can be efficiently addressed.

Thus, description has been given of the support system for designing a web page that takes into consideration a user having particular visual characteristics, such as a visually impaired person or an aged person, in web page creation. This technique may also be utilized in viewing a web page. Designing with consideration for particular visual characteristics cannot be forced on all web pages existing on the Internet. Therefore, the technique of this embodiment is used to modify a web page when the web page is displayed on a terminal of a user who views the web page.

In the stage of creating a web page, it is not generally advantageous to automatically modify the web page regardless of the intention of the web page creator. Therefore, in the above described embodiment, the result presentation section 40 indicates modification portions on the web page and lists possible modification methods to the web page creator for prompting him/her to select a modification method. However, if a user uses his/her own terminal to view web pages, the user of the terminal is limited to that person. Therefore, for a user having certain visual characteristics, web pages to be displayed on a display of the user's terminal may be automatically subjected to modification corresponding to the user's visual characteristics. In this case, modification portions and modification methods are not presented to the user: rather, an image processing method and an appropriate modification method corresponding to the user's visual characteristics are preset. The image processing section 30 and the result presentation section 40 automatically execute the preset processing when displaying web pages. This configuration can eliminate user's operation such as indicating an image processing method to the image processing section 30 and indicating a modification method to the result presentation section 40 every time a web page is displayed, which may be cumbersome for the user.

This embodiment has been described for the system that processes HTML documents. However, this embodiment may also be applied to documents written in languages other than HTML, for example, XML (Extensible Markup Language) documents, SVG (Scalable Vector Graphics) files, and PDF (Portable Document Format) files, if they are displayed and viewed as an image on a display device. In addition, this embodiment simulates desired visual characteristics by actually generating an image and performing image processing. Then, portions considered hard to view for a user having the simulated visual characteristics are located as modification portions, based on which a document file (original data of the image) is modified. However, processing up to the point of performing simulation with the actually processed image and indicating modification portions may be applied not only to these document files but also to image data in general.

Thus, the present invention enables analyzing the readability of an image to be displayed on a terminal and appropriately modifying the image. The present invention also enables providing a data editing system for supporting creation of a screen easily viewed by a user having trouble with his/her eyesight, such as a visually impaired person or an aged person.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A data editing apparatus for at least one of: storing, displaying or printing processed images, said editing apparatus comprising sections stored on a computer readable medium, said sections including:
    a rendering section for generating an image by rendering an HTML document;
    an image processing section for performing image processing on the image generated by the rendering section and evaluating the processed image;
    a modification element locating section for locating an HTML element that needs to be modified in the HTML document, the step of locating being based on an evaluation result of the image processing section, said sections for enabling readability of said HTML document on a display; a modification method retrieval section for searching a database for modification methods for the HTML element that needs to be modified located by the modification element locating section; and
    a display control section for outputting the HTML element that needs to be modified and the modification methods retrieved by the modification method retrieval section on a display.

2. The data editing apparatus according to claim 1, further comprising a document modification processing section for modifying the HTML element that needs to be modified in the HTML document located by the modification element locating section, the modification being made according to a modification method selected from the modification methods retrieved by the modification method retrieval section.

3. The data editing apparatus according to claim 1, further comprising a document modification processing section for modifying the HTML element that needs to be modified in the HTML document located by the modification portion locating section, the modification being made according to a preset modification method.

4. A computer program product comprising a computer usable medium having computer readable program code means embodied therein for causing functions of a data editing apparatus, the computer readable program code means in said computer program product comprising computer readable program code means for causing a computer to effect the functions of claim 1.

5. A data editing apparatus for at least one of: storing, displaying or printing processed images, said editing apparatus comprising sections stored on a computer readable medium, said sections including:
    a rendering section for generating an image by rendering an electronic document;
    an image processing section for performing image processing on the image generated by the rendering section to simulate how the image is viewed under a certain visual characteristic;
    a modification element locating section for locating a modification portion in the electronic document based on a processing result of the image processing section; and
    a modification processing section for modifying the modification portion in the electronic document located by the modification element locating section, said sections for enabling readability of said electronic document on a display, wherein the image processing section comprises:
        an image quality changing section for changing the quality of the image generated by a the rendering section, the change being made according to the visual characteristic; and
        an image quality determining section for determining the quality of the image processed by the image quality changing section, and
    wherein the image quality determining section compares the image generated by the rendering section with the image processed by the image quality changing section and determines a degree to which a shape of elements in the generated image is preserved in the processed image.

6. The data editing apparatus according to claim 5, wherein the image quality determining section evaluates a difference of color between elements and their adjacent part in the image processed by the image quality changing section.

7. The data editing apparatus according to claim 5, further comprising a modification method retrieval section for searching a database for modification methods for the modification element located by the modification element locating section,
    wherein the modification processing section modifies the modification portion located by the modification portion locating section according to a modification method selected from modification methods retrieved by the modification method retrieval section.

* * * * *